US005620805A

United States Patent [19]

Ogawa et al.

[11] Patent Number: 5,620,805

[45] Date of Patent: Apr. 15, 1997

[54] ALLOY AND MULTILAYER STEEL TUBE HAVING CORROSION RESISTANCE IN FUEL COMBUSTION ENVIRONMENT CONTAINING V, NA, S AND CL

[75] Inventors: Hiroyuki Ogawa; Tetsuo Ishitsuka; Koichi Nose, all of Futtsu, Japan

[73] Assignee: Nippon Steel Corporation, Tokyo, Japan

[21] Appl. No.: 535,120

[22] PCT Filed: Mar. 8, 1995

[86] PCT No.: PCT/JP95/00382

§ 371 Date: Oct. 26, 1995

§ 102(e) Date: Oct. 26, 1995

[87] PCT Pub. No.: WO95/24512

PCT Pub. Date: Sep. 14, 1995

[30] Foreign Application Priority Data

Mar. 8, 1994 [JP] Japan .................................... 6-036893

[51] Int. Cl.$^6$ .......................... B32B 15/18; C22C 38/44; C22C 38/48

[52] U.S. Cl. .......................... 428/683; 428/685; 138/143; 420/52; 420/53; 420/586.1

[58] Field of Search .................................... 428/679, 685, 428/680, 668; 420/52, 53, 54, 43, 584.1, 586.1; 138/143

[56] References Cited

U.S. PATENT DOCUMENTS

| | | | |
|---|---|---|---|
| 4,463,061 | 7/1984 | Otoguro et al. | 138/143 |
| 4,505,232 | 3/1985 | Usami et al. | 138/143 |
| 5,103,870 | 4/1992 | Ishii et al. | 138/143 |

FOREIGN PATENT DOCUMENTS

| | | | |
|---|---|---|---|
| 54-128417 | 10/1979 | Japan | 420/53 |
| 57-203740 | 12/1982 | Japan . | |
| 58-52463 | 3/1983 | Japan | 420/53 |
| 58-110660 | 7/1983 | Japan | 420/53 |
| 61-223106 | 10/1983 | Japan . | |
| 58-177438 | 10/1983 | Japan . | |
| 59-53343 | 12/1984 | Japan . | |

(List continued on next page.)

OTHER PUBLICATIONS

Rapp, Robert A.; "Chemistry & Electrochemistry of the Hot Corrosion of Metals", Corrosion, vol. 42, No. 10, Oct. 1986, pp. 568–577.

Yoshiba, Masayuki et al., "Hot Corrosion Behavior of Heat Resisting Alloys"; Iron & Steel, vol. 67, No. 7, 1981, pp. 156–165.

*Primary Examiner*—John Zimmerman

*Attorney, Agent, or Firm*—Kenyon & Kenyon

[57] ABSTRACT

The present invention provides a highly corrosion-resistant steel tube for use as a steel tube for boilers, etc., used for installations where fossil fuel or combustible refuse is burnt as an energy source.

An alloy which exhibits corrosion resistance in an environment where fuel containing V, Na, S and Cl is burnt, comprising up to 0.05% of C, 1.0 to 2.6% of Si, 0.02 to 0.5% of Mn, 20 to 28% of Cr, 24 to 36% of Ni, up to 4% of Mo, up to 0.4% of Nb, up to 0.05% of Al and the balance Fe and unavoidable impurities, and satisfying the following inequalities:

$$Ni \geqq (Cr+2Si+0.5Mo),$$

$$Nb \geqq 8C,$$

and $$Mo(Cr-18) \geqq 8,$$

and a multilayer steel tube comprising said alloy as a liner and a standardized boiler steel tube as a base layer.

2 Claims, 4 Drawing Sheets

FOREIGN PATENT DOCUMENTS

| | | | |
|---|---|---|---|
| 60-224763 | 11/1985 | Japan | 420/53 |
| 61-99660 | 5/1986 | Japan . | |
| 61-99657 | 5/1986 | Japan | 420/586.1 |
| 63-38558 | 2/1988 | Japan . | |
| 64-17806 | 1/1989 | Japan . | |
| 2-203092 | 8/1990 | Japan | 138/143 |
| 4-221034 | 8/1992 | Japan . | |

ALLOY AND MULTILAYER STEEL TUBE HAVING CORROSION RESISTANCE IN FUEL COMBUSTION ENVIRONMENT CONTAINING V, NA, S AND CL

This application was filed under 35 U.S.C. 371 PCT/JP95/00382, Mar. 8, 1995.

FIELD OF THE INVENTION

The present invention relates to an alloy for a steel tube used in an environment like in a boiler where fuel containing V, Na, S and Cl, for example, crude oil, heavy oil, tar or coal, is burnt on in a refuse incineration environment. The present invention also relates to a multilayer steel tube which exhibits high hot corrosion resistance and high hot erosion resistance in the presence of $V_2O_5$, $Na_2SO_4$, NaCl, and the like formed in such an environment.

BACKGROUND OF THE INVENTION

In a combustion environment like in a boiler where crude oil, heavy oil, and the like are used as fuel or in refuse incineration, $V_2O_5$, $Na_2SO_4$, NaCl, KCl and $CaSO_4$ present in the fuel or formed during combustion adhere to corrosion products such as oxidized scales, and deposit thereon to form a molten salt environment. As a result, a type of corrosion termed vanadium attack and hot corrosion takes place.

Literature on related techniques (e.g., Corrosion, 42, 568 (1986); Iron and Steel, 67, 996 (1981)) illustrates that alloy components such as Cr and Ni have a corrosion resistance to a certain degree to such types of corrosion, particularly to vanadium attack. Moreover, Unexamined Japanese Patent (Kokai) No. 58-177438 discloses an austenitic stainless steel having an improved high temperature corrosion resistance.

On the other hand, many processes are known for producing a double layer tube. For example, there is a process for producing a welded multilayer steel tube, wherein a cladding alloy is temporarily bonded to a carbon steel or low alloy steel, the bonded material is further hot rolled to give a so-called clad steel sheet or plate, and the sheet or plate is subjected to submerged arc welding. There is also a conventional process for producing a multilayer steel tube, wherein a final product is directly clad with a metal. For example, Unexamined Japanese Patent Publication (Kokai) No. 61-223106 discloses a process for directly producing a final product, a multilayer steel tube, comprising cladding a metal material with high alloy powder by hot isostatic pressing. Furthermore, Unexamined Japanese Patent Publication (Kokai) No. 64-17806 discloses a process for producing a multilayer steel tube, though the method for producing a multilayer billet is not clearly described.

DISCLOSURE OF THE INVENTION

When tar, coal, heavy oil, or the like, or combustible refuse containing plastics is used as fuel in installations such as a thermal power plant where fossil fuel or combustible refuse is burnt as an energy source, the combustion products of such a fuel, etc. often contain large amounts of V, Na, S and Cl. Low-melting-point compounds containing $V_2O_5$, $Na_2SO_4$, NaCl, etc. are, therefore, formed on the surface of the furnace wall tubes, steam superheater tubes, etc. of the thermal power plant or combustion installation. As a result, the scales formed on the tube surface are fused to cause hot corrosion, and the furnace wall tubes, steam superheater tubes, etc., are destroyed during the operation of the thermal power plant or combustion installation over a long period of time.

Furthermore, when coal burning boilers, or refuse incinerators and thermal power plants of the fluidized bed furnace bed type are used, hot erosion caused by combustion ash and fluid sand takes place on the surface of the furnace wall tubes, steam superheater tubes, etc. to promote hot corrosion.

An object of the present invention is to provide, at low cost, an alloy exhibiting a high corrosion resistance and a high erosion resistance in a high temperature combustion environment where $V_2O_5$, $Na_2SO_4$, NaCl, and the like are present, and a multilayer steel tube comprising the alloy.

As the result of carrying out research on materials suited to a high temperature combustion environment where $V_2O_5$, $Na_2SO_4$, NaCl, KCl and $CaSO_4$ are formed during combustion and adhere to and deposit on oxidized scales, the present inventors have made the discoveries described below.

(i) In the high temperature combustion environments mentioned above, the corrosion resistance of the alloy does not depend on the content of Cr alone but on the combination of Ni, Cr and Mo. That is, a high Cr alloy generally has a corrosion resistance in a high temperature oxidizing environment having a high $O_2$ content. However, the high Cr content alloy does not necessarily have a corrosion resistance in thermal power plants and refuse incineration installations where crude oil, heavy oil, tar, coal, and the like are used as fuel, because the $O_2$ content therein is decreased to reduce the content of $NO_x$.

(ii) In the high temperature combustion environment as mentioned above, there are formed within the scales formed on the alloy surface, low melting-point compounds, for example, eutectic compounds such as $Na_2O—V_2O_5$ and $NaCl—Na_2SO_4—KCl—CaSO_4$, and fused scales are formed. As a result, the scales on the alloy surface are locally fused, and the protective scales disappear. The corrosion rate, therefore, becomes extraordinarily great. Moreover, hot erosion caused by fluid sand and coal ash increases the corrosion rate.

(iii) The local fusion of scales is caused at first by the dissolution of alloy scales such as $Fe_2O_3$ in a fused liquid of low melting-point compounds such as $Na_2O—V_2O_5$ formed in the scales. Making the scale composition difficult fuse into the fused liquid is effective in enhancing the corrosion resistance of the alloy. That is, it is necessary to design the alloy composition so that scales having such a composition are formed.

(iv) In order to impart hot erosion resistance to the alloy, inhibition of the formation of giant precipitates as well as the strengthening of the matrix are required. Especially when continuous carbonitrides are formed along grain boundaries, the carbonitrides are selectively eroded by molten scales, whereby the amount of corrosion is increased. Accordingly, it is necessary to inhibit the grain boundary precipitation thereof.

(v) The multilayer steel tube is used in the temperature range of 400° to 700° C. where various precipitates are formed. Since carbides are dissolved in low melting-point scales, continuous precipitation of carbides, for example, continuous precipitation of carbides along grain boundaries, increases the amount of corrosion. Accordingly, the C content of the liner material is required to be decreased.

(vi) When the multilayer steel tube is used as a steam superheater tube, etc., the steel tube is required to be subjected to cold working such as U-bending. The alloy used as the outer layer tube or inner layer tube is, therefore, required to be cold worked to a degree at least equivalent to the cold working degree of the steel tube for boilers used as the base layer. Accordingly, the alloy is required to be designed so that it satisfies necessary cold workability as well as corrosion resistance.

The present invention has been achieved on the basis of the discoveries as mentioned above, and the subject matter thereof is as described below.

(1) An alloy which has a corrosion resistance in an environment where fuel containing V, Na, S and Cl is burnt, comprising, in terms of % by weight, up to 0.05% of C, 1.0 to 2.6% of Si, 0.02 to 0.5% of Mn, 20.0 to 28.0% of Cr, 24.0 to 36.0% of Ni, up to 4% of Mo, up to 0.4% of Nb, up to 0.05% of Al, and the balance Fe and unavoidable impurities, and satisfying the following inequalities:

$$Ni \geqq (Cr+2Si+0.5Mo),$$

$$Nb \geqq 8C,$$

and $$Mo(Cr-18) \geqq 8.$$

(2) A multilayer steel tube which has a corrosion resistance in an environment where fuel containing V, Na, S and Cl is burnt, comprising a standardized boiler steel tube as a base steel layer, and the alloy described in (1) as an outer liner layer or inner liner layer.

EMBODIMENTS OF THE PRESENT INVENTION

To order to design the alloy composition of the present invention, corrosion tests were conducted in an environment where the alloy having scales was to be used, that is, in a high temperature combustion environment while molten scales, consisting of low-melting compounds formed on the alloy surface, were simulated. In the molten scale simulation environment, test specimens were coated with a molten salt mixture, $15\%NaCl+15\%KCl+5\%CaSO_4+65\%PbCl_2$, to form a coating 1 mm thick, and the corrosion tests were conducted at 500° C. for 100 hours. The results thus obtained are shown in FIG. 1 and FIG. 2.

Figure 1:
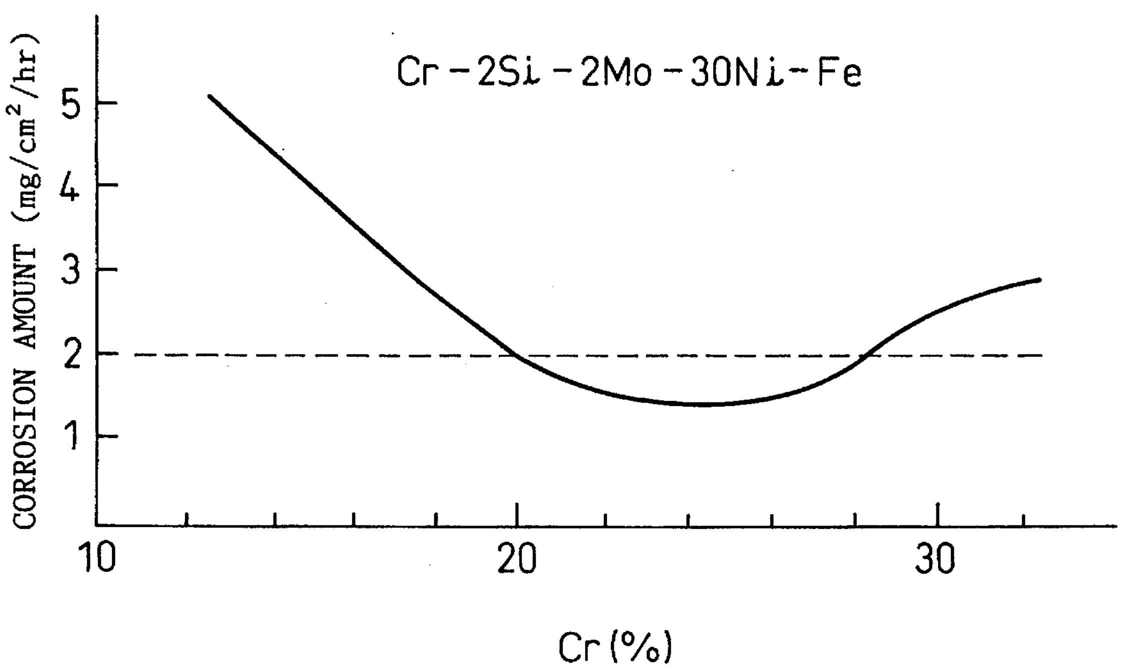
FIG. 1 is a graph showing the influence of the amount of Cr on the corrosion amount in a fused scale simulation environment.
Figure 2:
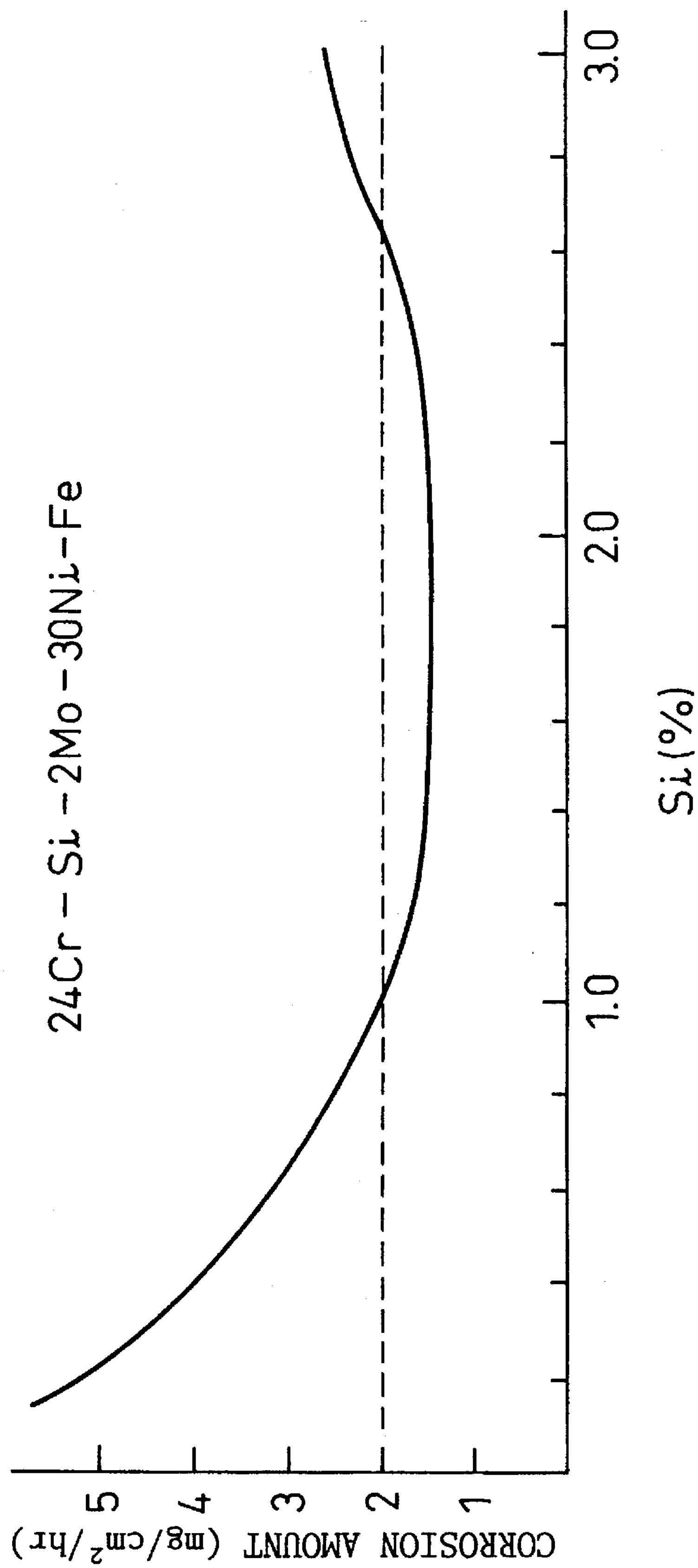
FIG. 2 is a graph showing the influence of the amount of Si on the corrosion amount in a fused scale simulation environment.

FIG. 1 shows the influence of Cr on the corrosion amount of the alloy comprising Cr—2Si—2Mo—30Ni—Fe. FIG. 2 shows the influence of Si on the corrosion amount of the alloy comprising 24Cr—Si—2Mo—30Ni—Fe. In addition, dotted lines in the figures indicate a desirable corrosion limit amount.

Furthermore, it is understood that the optimum ranges of the Cr content and the Si content are from 20.0 to 28.0% and from 1.0 to 2.6%, respectively.

When the alloy of the invention is used for a multilayer steel tube, deterioration of the cold workability thereof caused by δ-ferrite precipitation is required to be inhibited. The cold workability of the alloy was evaluated by flattening-close test in accordance with the flattening test stipulated by JIS G3463. The results are shown in FIG. 3.

Figure 3:
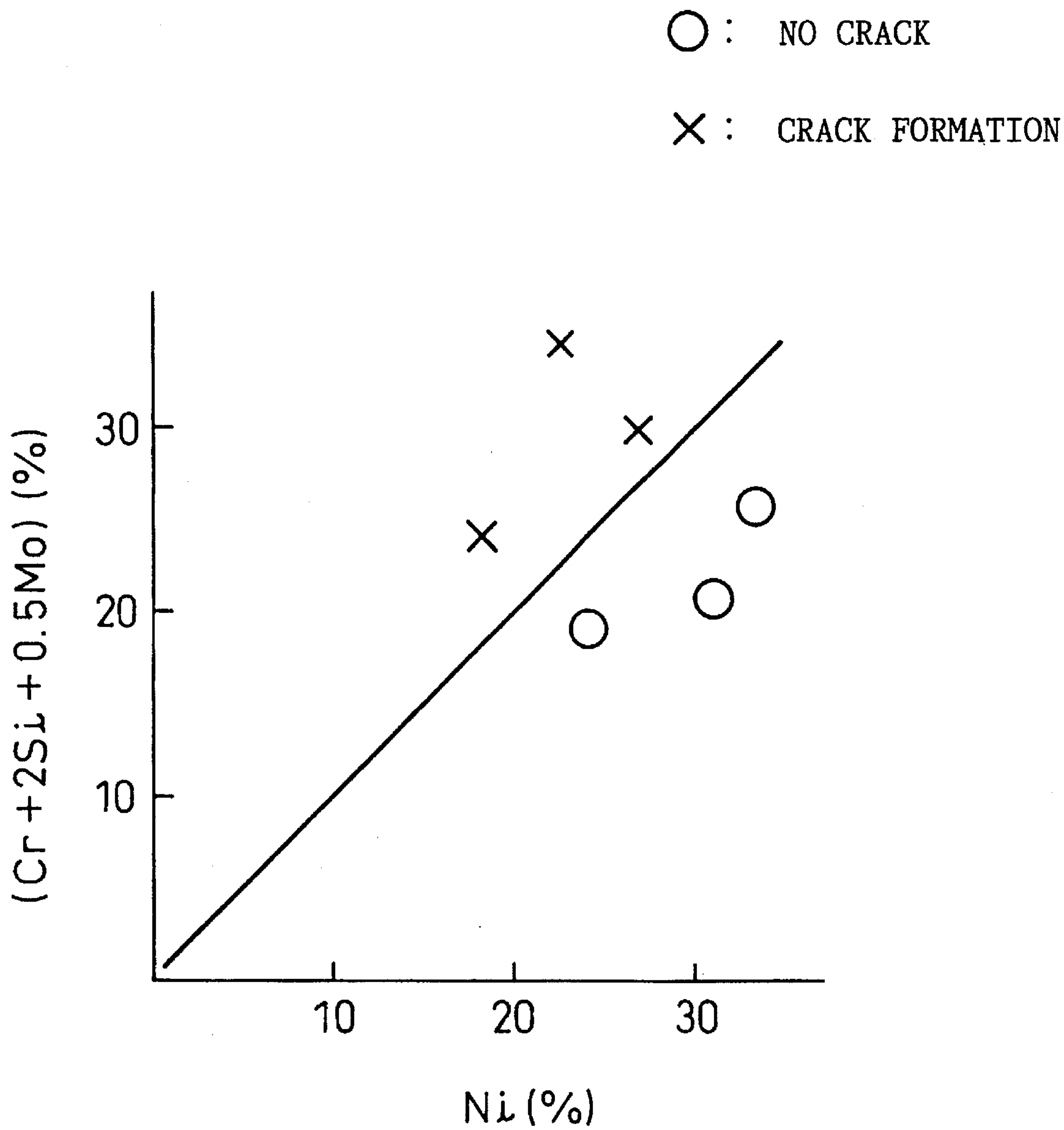
FIG. 3 is a graph showing the influence of the Ni content and the amount of (Cr+2Si+0.5Mo) on a flattening-close test.

FIG. 3 is a graph showing the influence of the Ni content and the content of (Cr+2Si+0.5Mo) on the flattening-close test. Although δ-ferrite is formed to lower the cold workability of the alloy when the alloy contains at least 20% of Cr, at least 1% of Si and a large amount of Mo, cracks are not formed and a good cold workability of the alloy is obtained when $Ni \geqq Cr+2Si+0.5Mo$.

The alloy is required to be of an austenitic structure for the purpose of ensuring corrosion resistance.

Figure 4:
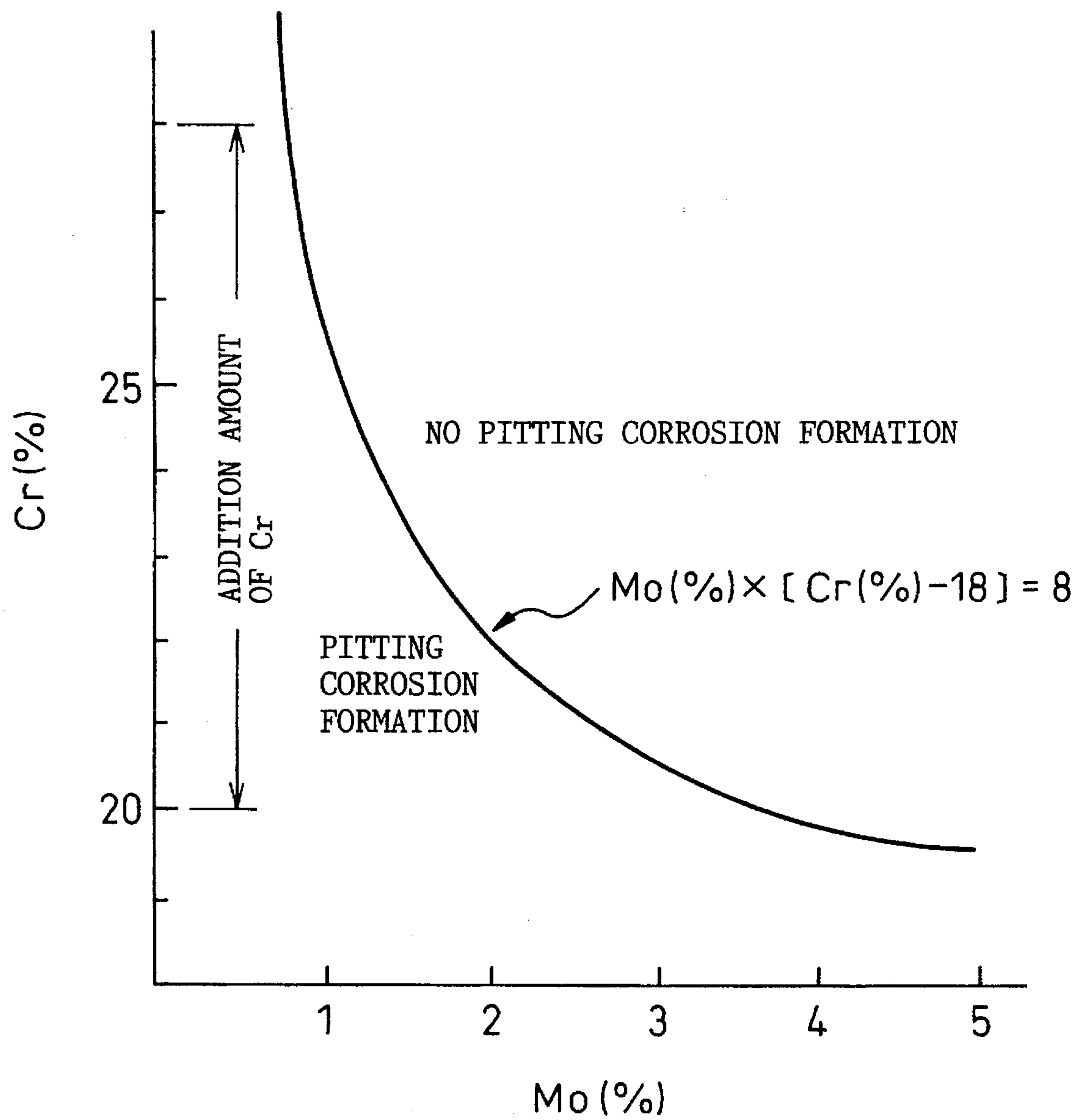
FIG. 4 is a graph showing the effects of Cr and Mo on the inhibition of pitting corrosion in an environment at temperature near room temperature while combustion products are being simulated.

The alloy of the present invention is also required to have resistance to corrosion and pitting corrosion caused by an oxidizing environment and chlorides present in combustion products at the time when combustion is stopped in boilers, etc. The composite addition of Cr and Mo is effective in inhibiting pitting corrosion. To investigate the effects, pitting corrosion tests were carried out in a 5% $FeCl_3$ solution simulating the combustion products. FIG. 4 shows the results thus obtained.

FIG. 4 is a graph showing the effects of Cr and Mo on the inhibition of pitting corrosion, and the corrosion tests were conducted at 40° C. in a 5% $FeCl_3$ solution. To inhibit pitting corrosion in a Cr content range of 20.0 to 28.0%, the following conditions are required: the addition amount of Mo is up to 4%, and $Mo(Cr-18) \geqq 8$.

From the results thus obtained, the content ranges of the components of the alloy of the present invention used as a liner are as described below.

C: Carbides are corroded by fused scales, and become a starting point of extraordinary corrosion. It is particularly necessary to inhibit continuous precipitation of carbides along grain boundaries. Since the precipitation of carbides is promoted in the alloy of the invention due to the high Si content, the C content is decreased during the production of the alloy while the upper limit of the C content is defined to be 0.05%, and Nb, which is described later, is added, whereby the precipitation thereof along grain boundaries is inhibited.

Si: Si is a component which improves hot erosion resistance, and it enhances, at the same time, the activity of C in the alloy and as a result increases the precipitation of carbides. Si also has a negative effect in that it acts as a strong ferrite-forming element to increase the precipitation of δ-ferrite and thus deteriorate the hot corrosion resistance. The optimum range of Si is from 1.0 to 2.6% as observed in the test results in FIG. 2. Since Si also acts as a deoxidizing agent during the preparation of the alloy, and since it is a potent ferrite-forming element, the content is restricted by the following inequality as well as by the content range as mentioned above $$Ni \geqq Cr+2Si+0.5Mo.$$

Mn: Mn is required to be added as a deoxidizing agent similarly to Si during the preparation of the alloy. The deoxidation effects are low when the addition amount is less than 0.02%, whereas the deoxidation effects are saturated when the addition amount exceeds 0.5%. Accordingly, the addition amount is defined to be at least 0.02% and up to 0.5%.

Cr: Cr is one of the major elements forming a corrosion resistant-oxide film which inhibits extraordinary corrosion caused by the formation of low-melting scales. However, Cr is a ferrite-forming element, which forms δ-ferrite during the production of the alloy, and is also a strong carbide-forming element. Since δ-ferrite causes extraordinary corrosion together with the carbides, the excessive addition of Cr rather deteriorates the corrosion resistance. The optimum range of the Cr content is from 22.0 to 28.0% as shown in FIG. 1.

Ni: Ni is an element which forms a corrosion-resistant oxide film together with Cr. Ni is added on condition that Cr and Si are added to at least 20% and to at least 1%, respectively, to maintain the austenitic structure. Since Ni is a costly alloy component, the content is defined to be in a necessary minimum range. Ni is added in a range of 24.0 to 36.0% while satisfying the following inequality:

$$Ni \geqq Cr+2Si+0.5Mo.$$

Mo: The composite addition of Cr and Mo is effective in inhibiting pitting corrosion in the alloy of the present invention caused by chlorides present in the combustion products and an oxidizing environment during the time when combustion in a boiler, etc. is stopped. To make the composite addition effective, the contents of Cr and Mo are required to satisfy the following inequality:

$$Mo(Cr-18) \geqq 8$$

under the condition that the addition amount of Mo is up to 4%.

Nb: When Cr carbides are continuously precipitated along grain boundaries, the hot corrosion resistance is deteriorated. Nb is, therefore, added in a trace amount so that it is intragranularly dispersion precipitated as Nb carbonitrides. The addition of Nb in a large amount causes precipitation of intermetallic compounds, deteriorates the hot corrosion resistance, and embrittles the alloy after the alloy is used over a long period of time. Accordingly, Nb is desirably added in an amount sufficient for inhibiting Cr carbide formation. Accordingly, Nb is added so that the addition amount is up to 0.4%, and satisfies the following inequality:

$$Nb \geqq 8C.$$

Al: Al is added as a deoxidizing agent during the preparation of the alloy. Since the addition of Al in a large amount embrittles the alloy of the present invention when the alloy is used at high temperature over a long period of time, the addition amount is restricted to up to 0.05%.

The process for producing the multilayer steel tube of the present invention will be explained below.

The surface of a stainless steel billet for a predetermined inner layer tube produced by a conventional stainless steel melting-casting process is clad with an alloy powder for the outer layer tube of the present invention by isostatic pressing (HIP method). The billet for a double layer tube is soaked, and formed to have a predetermined size by hot extrusion.

When the outer layer tube material is a sheet or plate, or a tube, the double layer steel tube can be produced by the following process instead of the process comprising cladding a steel tube with a powder by HIP: a stainless steel billet for the inner layer tube is wound with a plate or sheet having the chemical composition of the outer layer tube, or a tube having the chemical composition thereof is fitted on the billet; the outer layer tube material and the billet for the inner layer tube are bonded by welding; the double layer steel tube is produced by the process as mentioned above using the billet for a double layer tube thus obtained. The alloy of the invention having a high Si content lowers its hot deformability when conventionally hot worked. However, the alloy does not lower its hot deformability when tubed by HIP-hot extrusion.

When the alloy of the present invention is used for a multilayer steel tube, the multilayer steel tube comprises as a base layer a carbon steel, a low alloy steel or stainless steel, which is stipulated by JIS G3461, JIS G3462, JIS G3463, etc. and used as a steel tube for boilers, and the alloy of the invention as an outer layer liner or inner layer liner.

It is needless to say that the process for producing the multilayer steel tube of the present invention is not restricted to the processes mentioned above, and that any of conventional processes for producing a composite steel tube or multilayer steel tube can be adopted.

The present invention may also be embodied by making a steel tube or high temperature material having a similar shape, for example, a nozzle, have multilayers through thermal spraying such as LPPS.

EXAMPLES

Corrosion tests and flattening-close tests were conducted on the alloys of the present invention and comparative alloys having chemical compositions shown in Table 1. The test specimens of the alloys of the present invention (Sample 1 to Sample 8) were prepared by cutting out outer layers 1.5 mm thick from double layer steel tubes produced by a HIP-hot extrusion process.

TABLE 1

| | | Chemical composition (wt. %) | | | | | | | | Corrosion test | | |
|---|---|---|---|---|---|---|---|---|---|---|---|---|
| | | | | | | | | | | Corrosion in molten salts | Pitting | Flattening- |
| No. | Sample | C | Mn | Si | Cr | Ni | Mo | Nb | Al | ($mg/cm^2/hr$) | corrosion | close test |
| 1 | Alloy of invention | 0.023 | 0.16 | 1.30 | 27.5 | 34.1 | 1.2 | 0.21 | 0.007 | 1.8 | No | No crack |
| 2 | Alloy of invention | 0.040 | 0.17 | 1.56 | 26.7 | 32.0 | 2.8 | 0.35 | 0.012 | 1.7 | No | No crack |
| 3 | Alloy of invention | 0.032 | 0.15 | 2.22 | 21.6 | 29.1 | 3.6 | 0.30 | 0.030 | 1.9 | No | No crack |
| 4 | Alloy of invention | 0.015 | 0.14 | 1.85 | 24.9 | 29.8 | 2.1 | 0.15 | 0.005 | 1.3 | No | No crack |
| 5 | Alloy of invention | 0.028 | 0.18 | 1.43 | 27.2 | 31.2 | 1.6 | 0.25 | 0.018 | 1.9 | No | No crack |
| 6 | Alloy of invention | 0.038 | 0.16 | 1.98 | 23.8 | 29.5 | 3.2 | 0.35 | 0.006 | 1.4 | No | No crack |
| 7 | Alloy of invention | 0.007 | 0.18 | 1.65 | 25.1 | 29.8 | 2.2 | 0.10 | 0.041 | 1.6 | No | No crack |

TABLE 1-continued

| | | Chemical composition (wt. %) | | | | | | | | Corrosion test | | |
|---|---|---|---|---|---|---|---|---|---|---|---|---|
| No. | Sample | C | Mn | Si | Cr | Ni | Mo | Nb | Al | Corrosion in molten salts ($mg/cm^2/hr$) | Pitting corrosion | Flattening-close test |
| 8 | Alloy of invention | 0.025 | 0.19 | 1.36 | 20.5 | 25.0 | 3.4 | 0.12 | 0.008 | 1.9 | No | No crack |
| 9 | Comparative alloy | 0.051 | 1.06 | 0.62 | 16.9 | 12.0 | 2.2 | — | 0.003 | 8.9 | Yes | No crack |
| 10 | Comparative alloy | 0.033 | 0.18 | 0.65 | 20.8 | 27.2 | 3.7 | — | 0.002 | 7.8 | Yes | No crack |
| 11 | Comparative alloy | 0.028 | 0.58 | 2.80 | 25.6 | 18.3 | 2.6 | 0.22 | 0.006 | 2.1 | No | Crack formation |
| 12 | Comparative alloy | 0.065 | 1.10 | 0.52 | 24.8 | 19.8 | — | — | 0.006 | 4.3 | Yes | No Crack |

Molten salts of the composition, 15%NaCl+15%KCl+5%$CaSO_4$+65%$PbCl_2$, were used used in molten salt corrosion tests. The test specimens were held at 500° C. for 100 hours therein, and the amounts of corrosion were measured. Moreover, pitting corrosion tests were conducted by holding the test specimens at 40° C. using a 5% $FeCl_3$ solution, and observing the resultant surface thereof. Flattening-close tests were conducted in accordance with a flattening test stipulated by JIS G3463.

As shown in Table 1, the alloys of the present invention exhibited decreased amounts of molten salt corrosion, formed no pitting corrosion, and showed no crack formation in the flattening-close tests. On the other hand, the comparative alloys exhibited several times as much molten salt corrosion amounts as those of the alloys of the invention, pitting corrosion formation, and high proportions of crack formation in the flattening-close tests.

POSSIBLITY OF UTILIZATION IN THE INDUSTRY

According to the present invention, there can be obtained a multilayer steel tube having as the inner layer tube a steel tube for boilers which is resistant to corrosion caused by steam oxidation, and as an outer layer tube an alloy which has an excellent corrosion resistance in an environment where fuel containing V, Na, S and Cl is burnt, or in an environment where refuse or industrial waste is burnt. It becomes possible to provide a furnace wall tube, a steam superheater tube, or the like having a high corrosion resistance, in such environments as mentioned above, by the use of the steel tube.

We claim:

1. An alloy which has a corrosion resistance in an environment where fuel containing V, Na, S and Cl is burnt, comprising, in terms of % by weight, up to 0.05% of C, 1.0 to 2.6% of Si, 0.02 to 0.5% of Mn, 20.0 to 28.0% of Cr, 24.0 to 36.0% of Ni, up to 4% of Mo, up to 0.4% of Nb, up to 0.05% of Al, and the balance Fe and unavoidable impurities, and satisfying the following inequalities:

$$Ni \geqq (Cr+2Si+0.5Mo),$$

$$Nb \geqq 8C,$$

and $$Mo(Cr-18) \geqq 8.$$

2. A multilayer steel tube which has a corrosion resistance in an environment where fuel containing V, Na, S and Cl is burnt, comprising a standardized boiler steel tube as a base steel layer, and the alloy according to claim 1 as an outer liner layer or inner liner layer.

* * * * *